N. MULLETT.
PLOWSHARE TONGS.
APPLICATION FILED AUG. 19, 1914.
1,147,533.
Patented July 20, 1915.
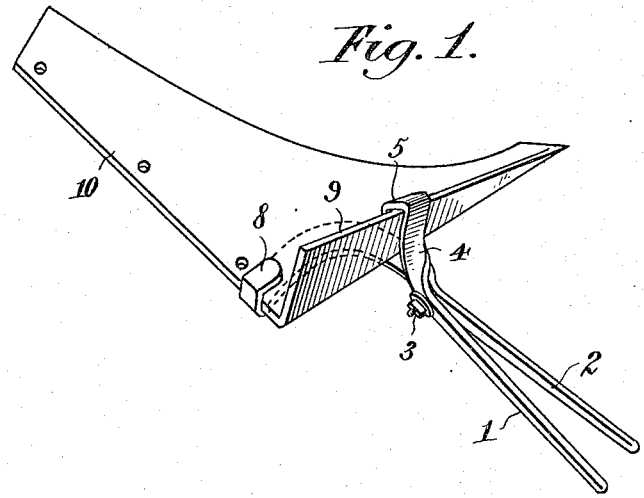
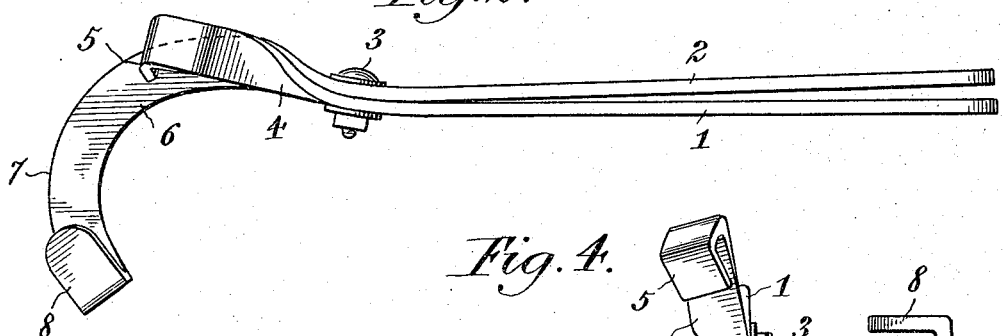
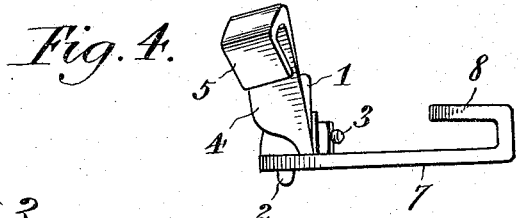
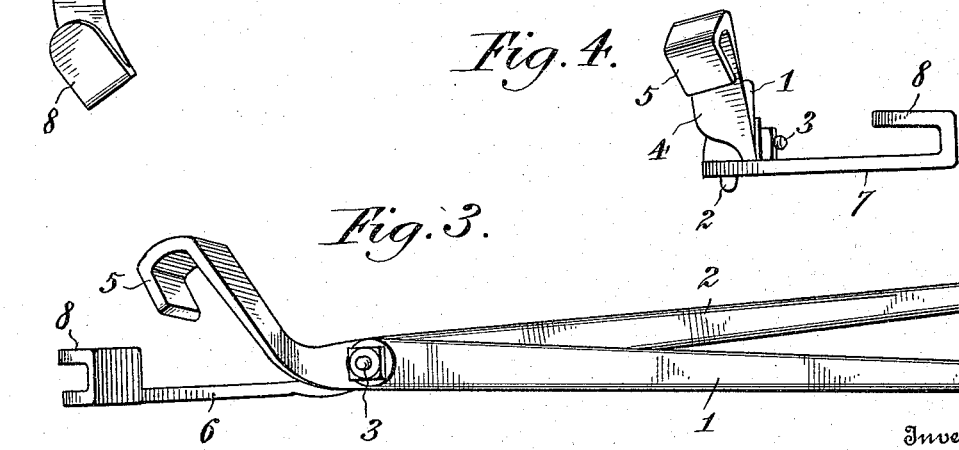
Inventor,
Norman Mullett.
By Victor J. Evans,
Attorney.
Witnesses:
C. Feinle, Jr.
Geo. Ackman, Jr.

UNITED STATES PATENT OFFICE.

NORMAN MULLETT, OF MORTTACH, SASKATCHEWAN, CANADA.

PLOWSHARE-TONGS.

1,147,533.　　　　Specification of Letters Patent.　　Patented July 20, 1915.

Application filed August 19, 1914.　Serial No. 857,567.

*To all whom it may concern:*

Be it known that I, NORMAN MULLETT, a subject of the King of Great Britain, residing at Morttach, in the Province of Saskatchewan and Dominion of Canada, have invented new and useful Improvements in Plowshare-Tongs, of which the following is a specification.

This invention relates to plowshare tongs, and has for its object to provide a construction of tongs whereby a plowshare may be firmly and securely held for sharpening, welding, pointing or other work.

The invention consists of the features of construction, combination and arrangement of parts herein fully described and claimed, reference being had to the accompanying drawing in which:—

Figure 1 is a perspective view showing the application of the tongs to a plowshare. Fig. 2 is a top plan view of the tongs removed from the plowshare. Fig. 3 is a side elevation of the tongs. Fig. 4 is a front end elevation thereof.

The tongs comprise handle members 1 and 2, which are pivoted together, at 3, where they cross each other, at a point where the lower handle member 1 is bent abruptly upward at nearly a right angle, as shown at 4, the portion 4 forming an abutment shoulder and terminating in a downwardly projecting hooked jaw 5.

The handle member 2 has a portion 6 which projects forwardly beneath and beyond the jaw 5 to a predetermined degree, a portion 7 projecting laterally at one side of the tongs at right angles to the handles, and a hooked jaw 8, bent upwardly and inwardly at the end of the portion 7, in a plane substantially at right angles to the hooked jaw 5, or transversely of the tongs.

In the use of the device, the tongs are arranged as shown in Fig. 1 to grip and hold a plowshare, the shoulder 4 being arranged to abut against the bottom of the landside plate 9, and the hooked jaw 5 engaged with the longitudinal free edge of said plate, while the portion 6 of the other handle or jaw member projects against the mold board side of the shank 10 of the share, parallel to the longitudinal axis thereof, while the part 7 projects rearwardly at said side of the shank and the hook 8 is engaged with the rear edge of the shank, whereby upon exerting pressure upon the handles 1 and 2 the share may be held firmly gripped against independent movement longitudinally or laterally. By this means a hot share may be firmly held without danger to the operator against any possibility of slipping while the operation of sharpening, welding or pointing is carried on.

I claim:—

Plowshare tongs comprising a pair of crossed and pivotally connected handles, one of said handles having a shoulder arranged at an angle thereto at the pivot point and terminating in a downwardly bent hook shaped jaw, and the other handle having a straight portion projecting forwardly below and in advance of said jaw, a portion bent laterally at right angles at one side of the tongs, and a hooked jaw at the end of said portion bent upwardly and inwardly in a direction toward and lying in a plane at right angles to the first-named jaw.

In testimony whereof I affix my signature in presence of two witnesses.

NORMAN MULLETT.

Witnesses:
　GEO. R. FORSYTHE,
　F. L. MULLETT.

Copies of this patent may be obtained for five cents each, by addressing the "Commissioner of Patents, Washington, D. C."